(12) United States Patent
Ratnaparkhi

(10) Patent No.: US 7,043,420 B2
(45) Date of Patent: May 9, 2006

(54) TRAINABLE DYNAMIC PHRASE REORDERING FOR NATURAL LANGUAGE GENERATION IN CONVERSATIONAL SYSTEMS

(75) Inventor: Adwait Ratnaparkhi, Monroe, NY (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 09/734,154

(22) Filed: Dec. 11, 2000

(65) Prior Publication Data

US 2002/0116173 A1    Aug. 22, 2002

(51) Int. Cl.
G06F 17/27 (2006.01)
G10L 13/00 (2006.01)

(52) U.S. Cl. ............... 704/9; 704/258; 704/260
(58) Field of Classification Search ............ 704/9, 704/7, 10, 258, 260
See application file for complete search history.

(56) References Cited

U.S. PATENT DOCUMENTS

| | | | | |
|---|---|---|---|---|
| 5,101,349 A | * | 3/1992 | Tokuume et al. | 704/9 |
| 5,418,717 A | * | 5/1995 | Su et al. | 704/9 |
| 5,806,021 A | * | 9/1998 | Chen et al. | 704/9 |
| 5,943,643 A | * | 8/1999 | Van De Veen | 704/2 |
| 2002/0026306 A1 | * | 2/2002 | Bangalore et al. | 704/9 |

OTHER PUBLICATIONS

Dale and Reiter Tutorial on Building Natural Language Generation Systems, EACL-99.*
Asahara et al. Jul. 2003, Extended Models and Tools for High-performance Part-of-speech Tagger, Proceedings of the 17th conference on Computational linguistics, vol. 1, 21-27.*
Reiter et al., 1995, Building Applied Natural Language Generation Systems, Cambridge University Press.*
Wang Weiwei et al., 1996, A natural Language Generation System Based on Dynamic Knowledge Base, Proceeding of ICSP.*
Berger et al., 1996, , A Maximum Entropy Approach to Natural Language Processing, Association for Computational Linguistics.*
Patten et al., Oct. 1991, Real-Time Generation of Natural Language, IEEE Intelligent Systems, vol.: 6, Issue: 5, pp.: 15-22.*
Langkilde, Irene, Generation that Exploits Corpus-Based Statistical Knowledge, 1998, Proceedings of the 36th conference on Association for Computational Linguistics—vol. 1, pp. 704-710.*
Pieraccini et al. A Learning Approach to Natural Language Understanding. Jun. 1, 1994, proceedings of the 1993 NATO ASI Summer School, pp. 1-19.*

* cited by examiner

Primary Examiner—Vijay Chawan
Assistant Examiner—Thomas E. Shortledge
(74) Attorney, Agent, or Firm—F.Chau & Associates, LLC

(57) ABSTRACT

A system and method to facilitate natural language generation in a human-to-machine conversational system that produces written or spoken output. In one aspect, a user provides a scoring function and grammar rules including words and attributes. A method according to the present invention then generates possible reorderings of the words and attributes using the grammar rules and determines an optimal ordering of the words and attributes using the scoring function, which is then returned to the user.

21 Claims, 3 Drawing Sheets

| RULES | HEAD | DIRECTION | PHRASE FRAGMENT | CONDITION |
|---|---|---|---|---|
| 1 | flights | right | "to$locTo" | {$locTo has not yet been generated} |
| 2 | flights | right | "to$locFr" | {$locFr has not yet been generated} |

FIG. 2

TRAINABLE DYNAMIC PHRASE REORDERING FOR NATURAL LANGUAGE GENERATION IN CONVERSATIONAL SYSTEMS

The U.S. Government has a paid-up license in this invention and the right in limited circumstances to require the patent owner to license others on reasonable terms as provided for by the terms of Government Contract Number MDA972-97-C-0012.

BACKGROUND

1. Technical Field

The present invention relates to conversational systems, and more specifically to a system and method to facilitate natural language generation in a human-to-machine conversational system that produces written or spoken output.

2. Discussion of the Related Art

Human beings communicate ideas with one another using a mechanism known as natural language. Natural language evolved as a medium of communication as human beings learned to communicate with one another. However, due to the inherent structure of natural language, it is an imperfect mechanism for conveying ideas. The human brain translates natural language into concepts and ideas, and allows communication between different individuals using natural language through a complicated translation process that no machine has been able to accurately duplicate.

A computer can generate written or spoken language output, but the structure of the language from a computer rarely resembles natural human language. Typically, prior art computer generated speech stores a limited number of sentences which can be expressed at predetermined times and in predetermined ways, which limits the expressiveness of computer-generated language.

For example, in a conversation with a conversational system, a user supplies the system with information in the form of a statement or a question. The system then responds to the user with a statement or a question. This exchange continues until the computer fulfills the user's request.

The information in a simple conversation can be represented with pairs of attributes and values. An attribute A and its corresponding value V are written in the form {A=V}. For example, the statement "a flight leaves at 3PM" in the domain or realm of air travel can be represented with the attribute-value pair {$timeDep="3PM"}, where $timeDep is the attribute denoting the departure time, and "3PM" is the textual instantiation of the attribute.

The majority of current conversational systems perform natural language generation (NLG) with templates. Templates comprise attributes interspersed between words of natural language. When the system requires a phrase, it first chooses a template, and then replaces the attributes in the template with their corresponding values in the run-time environment. For example, the template "a flight leaves at $timeDep" would be expanded to "a flight leaves at 3 PM" if the run-time environment contained the attribute-value pair {$timeDep="3 PM"}. Given a set of attribute-value pairs, a template provides a fixed way of rendering them into natural language. However, using such a natural language generation method with templates requires that a programmer write a different template for every new phrase to be created.

Accordingly, an accurate and dynamic technique for automatically and efficiently generating natural language is highly desirable.

SUMMARY OF THE INVENTION

The present invention is directed to a system and method for generating natural language by automatically determining possible reorderings of words and attributes, and then determining an optimal ordering of the words and attributes.

In an aspect of the present invention, a method for computer-based generation of natural language is provided comprising the steps of receiving a concept comprising attributes and corresponding values of each of said attributes from a user, receiving grammar rules from the user, each rule including a head, a phrase fragment, a direction and a condition, wherein each phrase fragment includes one of said attributes, receiving a scoring function from the user, generating possible natural language phrases using the grammar rules, determining an optimal natural language phrase from the possible natural language phrases using the scoring function, and returning said optimal natural language phrase to the user.

These, and other aspects, features, and advantages of the present invention will be described or become apparent from the following detailed description of preferred embodiments, which is to be read in connection with the accompanying drawings.

BRIEF DESCRIPTION OF THE DRAWINGS

FIG. 2 depicts an exemplary grammar comprising two grammar rules for generating flight descriptions in an air travel domain.

DETAILED DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

A natural language generation method according to the present invention dynamically determines word and attribute order based on one or more aspects of the dialog state. The method chooses between many possible grammatical phrases for a given set of attribute-value pairs to find the phrase with the most appropriate word and attribute ordering.

The ability to reorder words and attributes is important for the purposes of generating natural language. For example, in a conversation concerning the domain of air travel where information on departure times of flights out of Boston is being sought, the phrase "A flight from Boston that leaves at 3 PM" might be a more appropriate response that is more akin to what would be said in natural language than the phrase "A 3PM flight that leaves from Boston" even though it expresses the same information. The present invention is a domain-independent software framework that can efficiently and automatically perform dynamic reordering of words and attributes such that a most appropriate phrase for a given situation is found, and that does not require the programmer to specify all the possible orderings.

Figure 1:
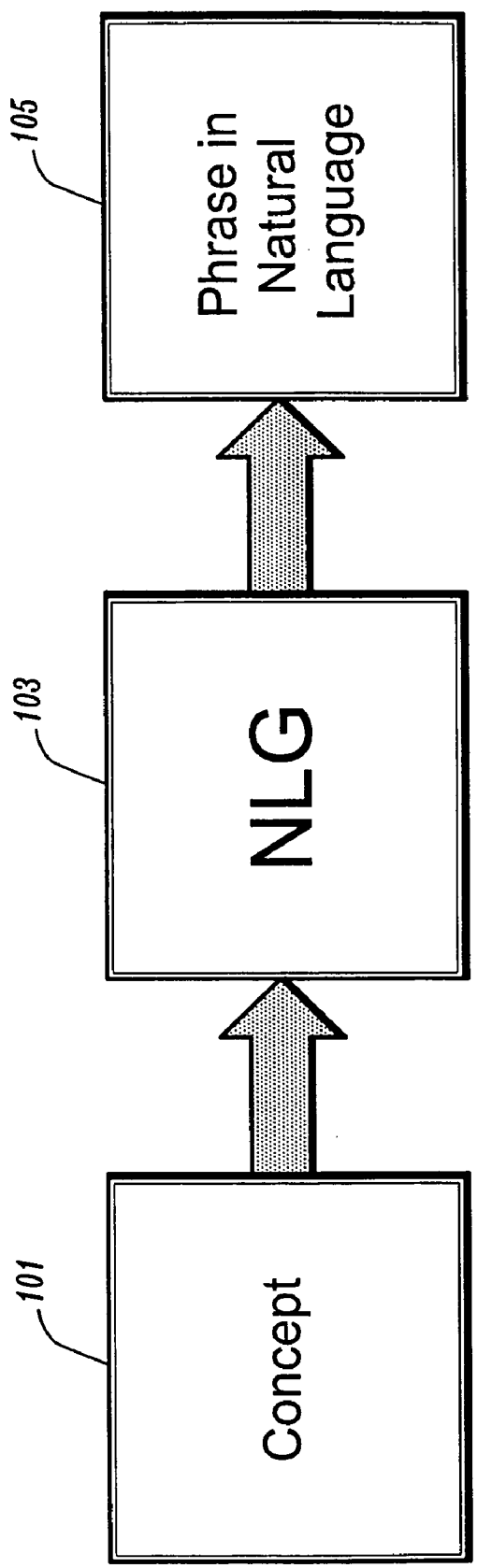
FIG. 1 is an exemplary flow chart depicting a method of data flow in natural language generation.

FIG. 1 is an example of a flow chart depicting a method of data flow in natural language generation in which a semantic representation of a concept 101 is taken as input by a natural language generation (NLG) module 103, and a phrase in natural language 105 that corresponds to the concept 101 is produced as output. A concept comprises attribute-value pairs. For example, a semantic representation of a concept in the air travel domain may be:

{$locFr="New York", $locTo="Boston"}

Possible corresponding English natural language phrases may be:

"A flight from New York to Boston"
"A flight from New York that arrives in Boston"
"A flight to Boston that leaves from New York"

The NLG module 103 requires grammar rules and a scoring function to be provided in advance.

The grammar rules preferably include a head, a direction, a phrase fragment and a condition. For exemplary purposes, the head is a user-specified word, which is typically the main word of the phrase, and the direction indicates the location of a phrase fragment as being, for example, left or right of the head. The phrase fragment is preferably a natural language phrase, and the condition is preferably a code fragment that evaluates to either 1 (true) or 0 (false) in the run-time environment of the conversational system. Any domain-specific restrictions on the usage of a particular grammar rule, for example, can be encoded in the condition of the grammar rule.

The scoring function comprises a predetermined formula to compute the score of a generated phrase. Preferably, N-gram language models that are used in known speech recognizers, are used, which will be described in further detail below.

A system according to the present invention finds an optimal natural language phrase by first using the provided grammar rules to generate a set of possible natural language phrases, and then searching this set of possible phrases for a highest scoring natural language phrase according to the predetermined scoring function.

Before the grammar rules can be applied, the condition of the grammar must be satisfied with respect to the phrase fragment to which it will be applied. A natural language phrase for describing the input semantic representation of a concept can then be constructed by several applications of grammar rules to the user-specified word (or head) which is typically the main word of the phrase. The particular sequence in which grammar rules are applied ultimately determines the word order within a generated natural language phrase. For example, when a direction is specified as "right", the phrase fragment of the rule is added to the right of the head and preferably to the right of any previously added phrase fragments to the head when the condition is satisfied. Similarly, when a direction is specified as "left", the phrase of the rule is added to the left of the head and preferably to the left of any previously added phrases to the head when the condition of the rule is satisfied.

FIG. 2 depicts two exemplary grammar rules for generating flight descriptions in an air travel domain. For illustrative purposes, the head 203 is specified as being the word "flights". Rule 1 (201) is interpreted to read that under a condition 209 that an attribute "$locTo" has not yet been generated, than a phrase fragment 207 "to $locTo" should occur somewhere in a direction 205 that is to the right of the head "flights". The interpretation of rule 2 (250) is that if a condition 209 is satisfied in which a "$locFr" attribute has not yet been generated, a phrase fragment 207 "from $locFr" should occur somewhere in a direction that is to the right of the head "flights".

It is readily apparant to one skilled in the art that the conditions (or code fragments) (209) are normally implemented as fragments of an interpreted language such as, for example, TCL, C++, etc. Preferably, the illustrative conditions 209 provide that each attribute is only generated once to prevent a phrase describing the same attribute from being produced and inserted into the same phrase ordering. This is shown here, for example, in Rule 1 (201) which has a condition 209 specifying that the phrase 207 "to $locTo" should only be used if the attribute $locTo has not yet been generated. Similarly, the condition in Rule 2 (250) prevents the use of the phrase "from $locFr" unless the attribute "$locFr" has not yet been generated.

Although the programmer specifies grammar rules which include various words and phrase fragments, the orderings of these words and phrase fragments relative to one another are not specified. Instead, a system according to the present invention automatically generates a set of possible phrase orderings using the grammar rules and then searches this set for an "optimal" phrase ordering which includes all of the attributes in the semantic representation. An optimal phrase ordering is consistent with the grammar rules specified by a user and is a highest scoring phrase according to a predetermined scoring formula. The attributes $locTo and $locFr will be substituted with their respective natural language values at the end of the generation process when the system finds the optimal phrase ordering.

In general, there may be hundreds or thousands of possible phrase orderings for a complex grammar rule. Advantageously, an aspect of the present invention provides that the number of grammar rules a programmer actually needs to write to generate such a large number of possible orderings is quite small. For example, an N number of rules written by the programmer can generate N factorial possible phrase reorderings.

The scoring function can be preprogrammed to return for example, the top 5, 10, etc. phrase orderings. In general, any scoring function can be used, such as N-gram language models that are used in known speech recognizers. Typically, a large sample database of text in the domain or genre of interest is required by the system to compute the score of a generated phrase.

The language model provides an estimate of the probability of a word sequence W for the given phrase generation task. To illustrate, the probability of a sequence of words is the probability of each individual word conditioned on, for example, the previous 2 words. The score of a phrase ordering can be given by the formula:

$$\Pi_{i=1\ldots N} P(w_i | w_{i-1}, w_{i-2})$$

where $P(w_i | w_{i-1}, w_{i-2})$ is a conditional probability model, N is the length of the phrase, and $w_i$ is the word w in position i of the phrase. The probability model is trained from the word co-occurrence statistics observed in the large text database.

In one aspect, a system according to the present invention uses a graph algorithm to search a fraction of the often numerous possible phrases that are generated by the grammar rules. In general, there may be hundreds or thousands of possible phrases resulting from a complex grammar function.

Figure 3:
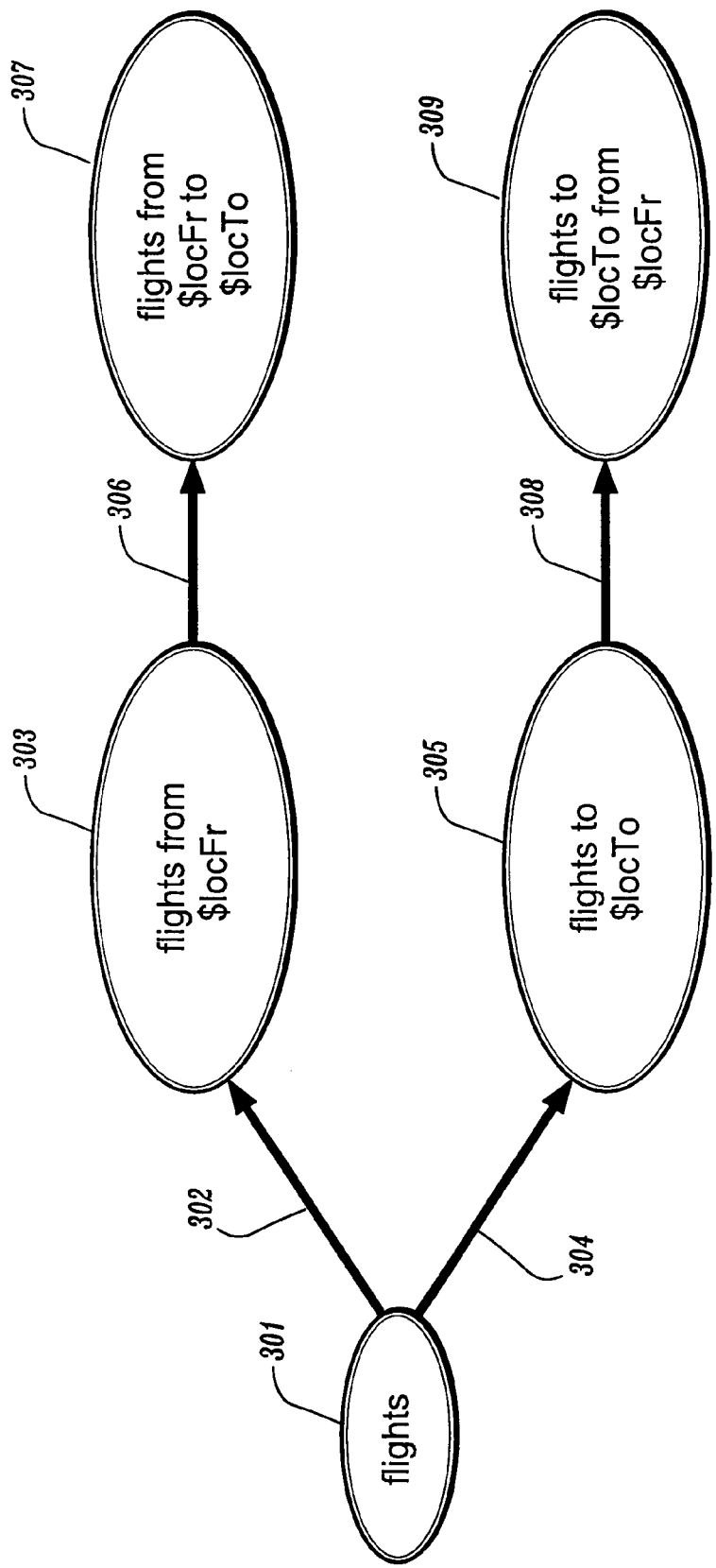
FIG. 3 depicts an exemplary graph algorithm showing two possible complete phrases and their respective intermediate phrases that may result from the two grammar rules in FIG. 2.

For illustrative purposes, FIG. 3 depicts a simplified example of a graph algorithm showing two possible complete phrases and their respective intermediate phrases that may result from the two grammar rules in FIG. 2. Heads and phrase fragments are represented as vertices in the graph. For example, the head "flights" is represented as an original vertex 301, the phrase fragment "flights from $locFr" is represented as a secondary vertex 303 and the phrase "flights to $locTo" is indicated as a secondary vertex 305. The vertices are connected by directed edges 302 which represent grammar rules. A set of vertices that has no outgoing directed edges is referred to as a frontier of the graph. In FIG. 3, the frontier is represented by vertices 307 and 309.

The system starts with an initial vertex that contains a user-specified word or head (typically the main word in a phrase), for example, the initial vertex 301 "flights". At the iteration of each search, the system applies grammar rules to the vertices in the existing frontier, thereby creating new frontier. Specifically, an application of a grammar rule to a phrase of an existing vertex results in a new, larger phrase, which is represented by a new vertex. For example, a directed edge 302 comprising Rule 2 (250) can be applied to the initial vertex 301 to result in an intermediate phrase or secondary vertex 303. Rule 2 provides placing the phrase fragment "from $locFr" to the right of the head "flights" so long as the attribute "$locFr" has not yet been generated. This produces the intermediate phrase 303 "flights from $locFr".

Next, a second directed edge 306 comprising Rule 1 (201) is applied to the intermediate phrase 303. Rule 1 dictates that the phrase fragment "to $locTo" be placed to the right of the head "flights". If there are any previously added phrase fragments after the head, then the phrase fragment "to $locTo" can be placed to the right of the previously added phrase fragments as well. This results in a complete phrase 307 "flights from $locFr to $locTo" which has both the attributes "$locFr" and "$locTo".

Phrases that mention all of the attributes in the input semantic representation of a concept are called complete phrases. The system's ultimate goal in the search is to find the vertex in the graph with the highest scoring complete phrase. The system can be programmed to return for example, a top 5 (K=5) number of highest scoring phrases. Phrases which contain multiple instances of the same attribute are disallowed, and low-scoring phrases are discarded by the system. The search terminates when at least one of the vertices in the new frontier comprises a complete phrase.

The result of the graph search will be a phrase that contains natural language interspersed with attributes, such as for example, "flights from $locFr to $locTo". Once the search is completed and a highest scoring complete phrase found, the attributes are replaced with their corresponding values specified in the input semantic representation, so that the final result comprises natural language. In the above example, the final result would be "flights from New York to Boston".

In a similar process, a complete phrase 309 can be produced by first applying a directed edge 304 comprising Rule 1 (201) to the initial vertex 301 to result in an intermediate phrase 305, and then applying a directed edge 308 comprising Rule 2 (250) to the intermediate phrase 305.

The method of expansion used in the present invention is based on the idea of context-free grammars. In one aspect, FIG. 3 illustrates an example in which a phrase fragment of a rule is placed after any previous phrases of preceding rules. In another aspect, recursive expansion may be used in which words specified in the phrase fragments of one rule can be recursively expanded by other rules. The search procedure will recursively apply rules in order to find complete phrases. To illustrate, given the following rules (the conditions have been omitted for clarity):

| head | direction | phrase | condition |
| --- | --- | --- | --- |
| 1) A | right | B C | |
| 2) B | right | D E | |
| 3) E | left | F G | | when the initial word given by the user is "A", it can be expanded via Rule 1 to "A B C". This can be further expanded using Rule 2 to "A B D E C". Using Rule 3, this can be expanded again to give "A B D F G E C".

In spoken dialogue, people typically express old information, i.e., information which is already known, at the beginning of a sentence and new information, i.e., information which is desired or being focused on, at the end of a sentence. Thus, in a conversational system, the ability to dynamically reorder phrases is necessary if the system is to properly emphasize the new information.

The present invention can implement this ability to reorder phrases by, for example, modifying the scoring function to reflect a preference for certain attribute orderings. To illustrate, each attribute can be assigned an individual priority by the programmer. The system can then generate a sentence in a way to reflect the priorities.

Another way the present invention can implement the ability to reorder phrases is by modifying the grammar rules. For illustrative purposes, the following rules can be used in the domain of hotels for putting new information (the "focus") at the end of a phrase, and the old information at the beginning. In the course of a conversation, certain attributes will represent new information, while other attributes will represent old information. The programmer can write two rules for each attribute, such that one rule expresses the attribute when it denotes old information and the other rule expresses the attribute when it denotes new information.

For example, the rules to define the grammar can have the following general format:

nlg_addrule hotelgram [head][direction][phrase expansion][TCL code fragment, i.e., the rule condition]

The exemplary words "nlg_addrule" and "hotelgram" are to inform the system that a rule is being entered.

The following rules can be used to define the grammar:
1) An example of a rule for when there is something in focus is:
   nlg_addrule hotelgram.-{there is a room that}{[llength [array name focus]]>0}
2) An example of a rule for when there is nothing in focus is:
   nlg_addrule hotelgram.-{there is a room}{[llength [array names focus]]==0}

In both of the above examples 1 and 2, the period "." after "hotelgram" indicates that the initial head word is a period. The "−" sign indicates that the direction is to the left of the head word.

3) An example of a rule for when a city is in focus is:

nlg_addrule hotelgram that+&{is located in $city}{[info exists city]&& [info exists focus(city)]}

Here, the word "that" is the head, and the "+" sign indicates that the phrase fragment "is located in $city" must occur to the right of the head. The "&" is an extension code which instructs the system to automatically put in commas and the word "and" as needed in the generated sentence. The words "info exists city" and "info exists focus (city)" are conditions which ask, respectively, "do we still have to generate a city variable?" and "is it in focus?" Both these conditions must be satisfied for a sentence to be generated with a city in focus.

4) An example of a rule for when a city is not in focus is:

nlg_addrule hotelgram room+{in $city}{[info exists city] && ![info exists focus(city)]}

Here, the word "room" is the head, and the phrase fragment "in $city" will occur to the right of the head. The conditions which must be satisfied for a sentence to be generated with a city that is not in focus are "do we still have to generate a city variable?" and "is it not in focus?"

After the rules for defining the grammar have been created and input into the system, commands for actually generating the text can be implemented.

These commands to generate text can have the following general format:

nlg_gen hotelgram model [head][attribute-value list]{ }{ }

The words "nlg gen" are a command to instruct the system to generate text.

The following commands can be used to generate the actual natural language text:

1) For example, a command for generating a sentence with a city in focus is:

---

A)  nlg_eval hotelgram { set focus(city) 1 }
B)  puts [ nlg_gen hotelgram model. {$city {New York} $price {$200} $roomtype {double}} {} {}]
C)  nlg_eval hotelgram { unset focus(city) 1 }

---

Here, the words "nlg_eval" are a command which sets and unsets the focus, and the word "puts" is a print command. Line A indicates to the system that a city is in focus, line B comprises a list of attribute/value pairs, and line C unsets the focus on the city after the sentence is generated to return the system to its original state.

An exemplary result from the above grammar rules and commands in which a city is in focus is:

| Focus | Sentence |
|---|---|
| city | there is a double room under $200 that is located in New York. |

Advantageously, the present invention eliminates the need for a programmer to specify every possible ordering of various words and phrase fragments. Instead, templates which a programmer might ordinarily have to write manually are generated automatically using the above algorithm.

The programmer only has to specify attribute-value pairs, desired grammar rules and a scoring function, and a system according to the present invention will piece together the specified attributes, words and phrase fragments to find possible reorderings which are consistent with the grammar rules. The system will then use the scoring function to look for a highest scoring reordering.

Although illustrative embodiments of the present invention have been described herein with reference to the accompanying drawings, it is to be understood that the present invention is not limited to those precise embodiments, and that various other changes and modifications maybe affected therein by one skilled in the art without departing from the scope or spirit of the invention. All such changes and modifications are intended to be included within the scope of the invention as defined by the appended claims.

What is claimed is:

1. A computer-based method of generating natural language, comprising the steps of:
  receiving a concept comprising attributes and corresponding values of each of said attributes from a user;
  receiving grammar rules from the user, each rule including a head, a phrase fragment, a direction and a condition, wherein each phrase fragment includes one of said attributes;
  receiving a scoring function from the user;
  generating possible natural language phrases using the grammar rules;
  determining an optimal natural language phrase from the possible natural language phrases using the scoring function; and
  returning said optimal natural language phrase to the user.

2. The method of claim 1, wherein the head is a word.

3. The method of claim 1, wherein the phrase fragment is a natural language phrase fragment.

4. The method of claim 1, wherein the direction indicates a location of the phrase fragment.

5. The method of claim 1, wherein the condition is a code fragment for restricting use of a rule.

6. The method of claim 1, wherein each attribute in the optimal natural language phrase is replaced with its corresponding value.

7. The method of claim 1, wherein the optimal natural language phrase is a highest scoring natural language phrase that is consistent with the grammar rules.

8. The method of claim 1, wherein the scoring function is a probability P of a phrase of length N based on the probability P of a word $w_i$ conditioned on two previous words, $w_{i-1}$ and $w_{i-2}$, the scoring function comprises the equation:

$$\Pi_{i=1 \ldots N} P(w_i | w_{i-1}, w_{i-2}).$$

9. The method of claim 1, wherein the attributes are variables.

10. The method of claim 4, wherein the direction indicates that the location of the phrase fragment is right of the head.

11. The method of claim 4, wherein the direction indicates that the location of the phrase fragment is left of the head.

12. A program storage device readable by a machine, tangibly embodying a program of instructions executable by the machine to perform the method steps for generating natural language, the method comprising the steps of:
   receiving a concept comprising attributes and corresponding values of each of said attributes from a user;
   receiving grammar rules from the user, each rule including a head, a phrase fragment, a direction and a condition, wherein each phrase fragment includes one of said attributes;
   receiving a scoring function from the user;
   generating possible natural language phrases using the grammar rules;
   computing a score for each of the natural language phrases using the scoring function;
   returning the highest scoring natural language phrase to the user.

13. The program storage device of claim 12, wherein the head is a word.

14. The program storage device of claim 12, wherein the phrase fragment is a natural language phrase fragment.

15. The program storage device of claim 12, wherein the direction indicates a location of the phrase fragment.

16. The program storage device of claim 12, wherein the condition is a code fragment for restricting use of a rule.

17. The program storage device of claim 12, wherein each attribute in the optimal natural language phrase is replaced with its corresponding value.

18. The program storage device of claim 12, wherein the optimal natural language phrase is a highest scoring natural language phrase that is consistent with the grammar rules.

19. The program storage device of claim 12, wherein the scoring function is a probability P of a phrase of length N based on the probability P of a word $w_i$ conditioned on two previous words, $w_{i-1}$ and $w_{i-2}$, the scoring function comprises the equation:

$$\Pi_{i=1 \ldots N} P(w_i | w_{i-1}, w_{i-2}).$$

20. The program storage device of claim 12, wherein the attributes are variables.

21. A computer-based method of generating natural language, comprising the steps of:
   receiving a concept comprising attributes and corresponding values of each of said attributes from a user;
   receiving grammar rules from the user, each rule including a head, a phrase fragment, a direction and a condition, wherein each phrase fragment includes one of said attributes;
   receiving a scoring function from the user;
   generating a plurality of possible natural language phrases using the grammar rules;
   determining an optimal natural language phrase from the plurality of possible natural language phrases using the scoring function; and
   returning said optimal natural language phrase to the user;
   wherein the head is a word;
   wherein the phrase fragment is a natural language phrase fragment comprising a plurality of words;
   wherein the direction indicates a location of the phrase fragment;
   wherein the condition is a code fragment for restricting use of a rule using a binary evaluation during run-time.

* * * * *